US009432858B2

(12) United States Patent
Lewallen et al.

(10) Patent No.: US 9,432,858 B2
(45) Date of Patent: Aug. 30, 2016

(54) PROCEDURES, APPARATUSES, SYSTEMS, AND COMPUTER PROGRAM PRODUCTS FOR MICROWAVE THROUGHPUT FEEDBACK AND NETWORK ACTION USING SOFTWARE DEFINED NETWORKING

(71) Applicant: TELLABS OPERATIONS, INC., Naperville, IL (US)

(72) Inventors: Daniel Lewallen, Dallas, TX (US); Kenneth D. Fullett, Naperville, IL (US)

(73) Assignee: CORIANT OPERATIONS, INC., Naperville, IL (US)

( * ) Notice: Subject to any disclaimer, the term of this patent is extended or adjusted under 35 U.S.C. 154(b) by 56 days.

(21) Appl. No.: 14/187,080

(22) Filed: Feb. 21, 2014

(65) Prior Publication Data

US 2015/0245226 A1    Aug. 27, 2015

(51) Int. Cl.
*H04L 1/00* (2006.01)
*H04W 24/04* (2009.01)
*H04W 40/34* (2009.01)
*H04W 28/10* (2009.01)

(52) U.S. Cl.
CPC .............. *H04W 24/04* (2013.01); *H04W 40/34* (2013.01); *H04W 28/10* (2013.01)

(58) Field of Classification Search
CPC ......... H04L 47/10; H04L 47/11; H04L 47/12; H04L 47/13; H04L 47/14; H04L 45/28; H04L 45/29; H04L 45/30

USPC ............... 370/229–238.1, 395.1–395.72, 370/216–228, 535–537; 709/238–244; 455/445

See application file for complete search history.

(56) References Cited

U.S. PATENT DOCUMENTS 7,602,726 B1 * 10/2009 Sundaresan et al. .......... 370/237

FOREIGN PATENT DOCUMENTS

GB          2476999 A       7/2011
WO    WO 2007/140808 A1   12/2007

OTHER PUBLICATIONS

European Search Report dated Jul. 22, 2015.

* cited by examiner

*Primary Examiner* — Dady Chery
(74) *Attorney, Agent, or Firm* — Fitzpatrick, Cella, Harper, & Scinto

(57) ABSTRACT

A procedure for directing network traffic, and a system that operates in accordance with the procedure. One or more messages are received, notifying of a degradation or recovery of a network link and remaining available bandwidth. A policy decision is generated based on the degradation or recovery of the network link and remaining available bandwidth and capabilities of other equipment on the network. The policy decision is transmitted to a network element on the network.

23 Claims, 5 Drawing Sheets

PROCEDURES, APPARATUSES, SYSTEMS, AND COMPUTER PROGRAM PRODUCTS FOR MICROWAVE THROUGHPUT FEEDBACK AND NETWORK ACTION USING SOFTWARE DEFINED NETWORKING

BACKGROUND

1. Field

Example aspects described herein relate generally to directing data on a network, and, more specifically, to addressing degradation or failure of a microwave link on a network.

2. Description of the Related Art

In a network using microwave and/or Wi-Fi devices and connections, degradation of a microwave link can occur for a number of reasons. For example, when a microwave link relies on point-to-point transmission between antennas, the link can be degraded or blocked entirely due to weather such as heavy rain, or due to vegetation growing over or blocking the path of transmission. Degradation can also occur due to issues internal to the network, such as a hardware failure.

One conventional technique for addressing such degradation is to route network traffic around the impacted link (e.g., to another path on the network). Devices on the network may also transmit less data.

Nevertheless, packet forwarding devices (e.g., routers, Ethernet switches, optical transport network switches) or other equipment connected to an impacted link do not have visibility to the nature of the degradation. Put another way, the rest of the network is not aware of the nature of the problem or that a problem even exists. Thus, if the network attempts to address the problem by simply re-routing network traffic around the impacted link or reducing overall transmission rates, customer traffic may be arbitrarily dropped or delayed, and available bandwidth in other links may be overloaded.

SUMMARY

Existing limitations associated with the foregoing, as well as other limitations, can be overcome by a procedure for directing network traffic impacted by degradation at a network link, and by a system, apparatus, and computer program product that operates in accordance with the procedure.

In one example embodiment herein, the system comprises at least one network controller. The network controller includes an interface operable to receive one or more messages notifying of a degradation or recovery of a network link and remaining available bandwidth. The network controller also includes a processor operable to generate a policy decision based on the degradation or recovery of the network link and remaining available bandwidth and capabilities of other equipment on the network, and operable to transmit the policy decision to a network element on the network with the interface.

According to another example embodiment herein, a procedure for directing network traffic includes receiving one or more messages notifying of a degradation or recovery of a network link and remaining available bandwidth, generating a policy decision based on the degradation or recovery of the network link and remaining available bandwidth and capabilities of other equipment on the network, and transmitting the policy decision to a network element on the network.

In one example embodiment herein, the network element is arranged to receive the policy decision and effect the policy decision. In another example embodiment, the network element is a packet forwarding device (hereafter abbreviated as "PFD") such as a router.

In still another example embodiment herein, the policy decision instructs a PFD to adjust shapers which queue and direct the amount of traffic to network links.

In yet another example embodiment herein, the policy decision instructs a PFD of the network link to police arriving network traffic based on the nature of the traffic. The policing allows critical network traffic through the network link and drops non-critical traffic.

In another example embodiment herein, the policy decision instructs another PFD on the network to steer some network traffic away from the degraded network link.

In a further example embodiment herein, there is a determination of whether the network link has a trend to degrade periodically based on messages received on the network, and the policy decision is generated and issued prior to a next expected degradation based on the trend.

In another example embodiment herein, the network controller is notified of an upcoming expected degradation, and the policy decision is generated and issued prior to the start of the expected degradation. The policy decision instructs a PFD of the network link to direct critical network traffic to one or more paths on the network which have been predetermined to provide more reliability or superior performance.

In yet another example embodiment herein, the network link includes microwave equipment which detects the nature of the degradation and generates the message.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

DETAILED DESCRIPTION

Figure 1:
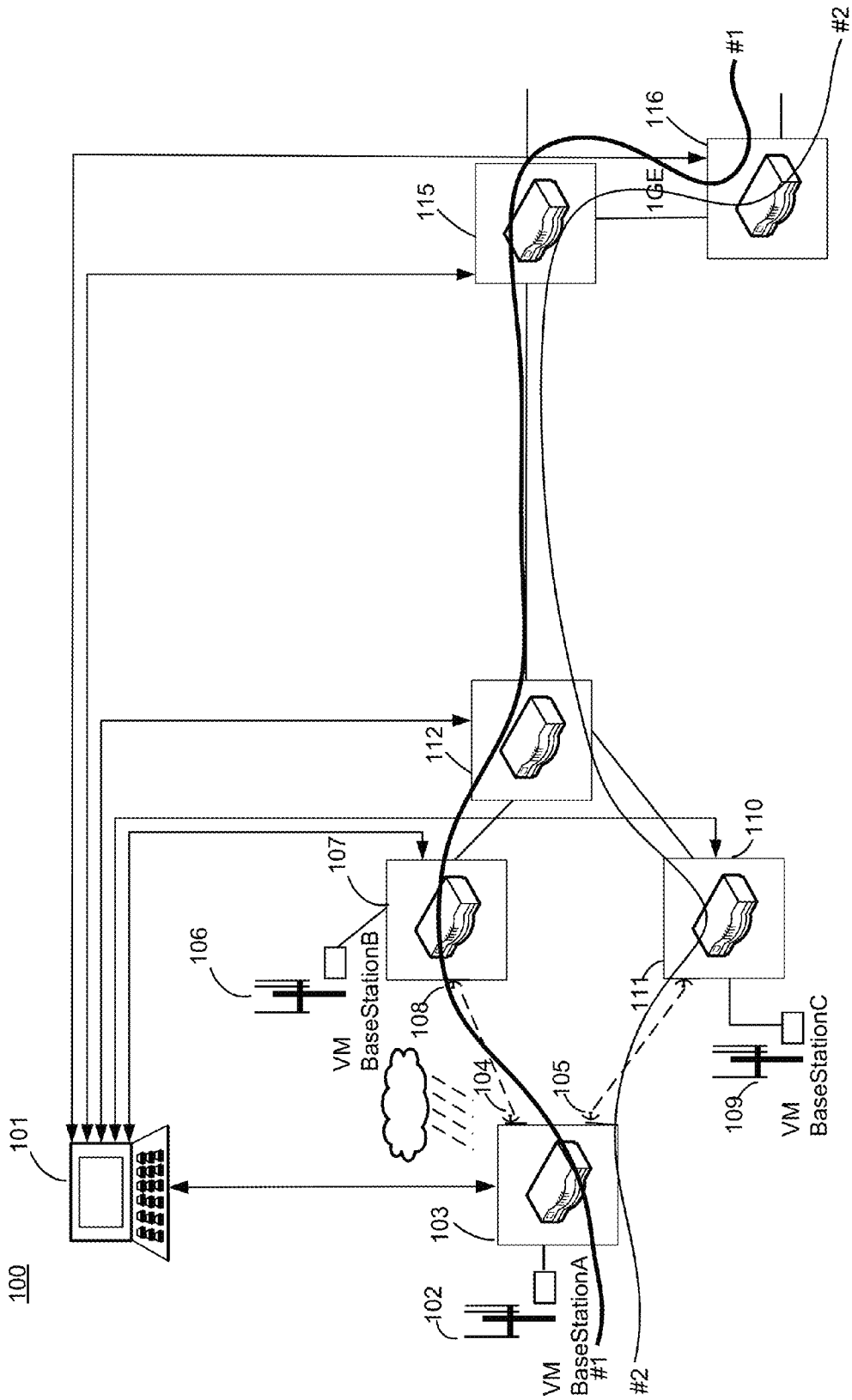
FIG. 1 is a representative view of a communication network according to an example embodiment described herein.

FIG. 1 is a representative view of a communication system 100 in which a plurality of network elements are provided with communication paths to other network elements, according to an example embodiment described herein.

Network controller 101 is a computing device which implements software defined networking (SDN) in accordance with at least some example aspects of the invention. Thus, network controller 101 can also be referred to as a "SDN controller". Network controller 101 communicates with other devices on the network to implement policy decisions for the network, as described more fully below. In that regard, while FIG. 1 explicitly depicts connections between network controller 101 and various devices, it should be understood that such connections are often virtual or logical (i.e., indirect) connections, rather than direct connections (although such direct connections also can be used). As also shown in FIG. 1, network controller 101 may be embodied as a computer, or, more specifically, a server. Although a server computer is shown in FIG. 1, it should be understood that network controller 101 could also be embodied in other computing devices or other arrangements, such as a locally networked bank of servers. Network controller 101 includes a processor, a memory, and input and output devices, as described more fully below with respect to FIG. 2.

PFDs 103, 107, 110, 112, 115 and 116 are network elements or network devices capable of forwarding data packets across one or more communication networks in accordance with a routing mechanism such as a routing table. Each of PFDs 103, 107, 110, 112, 115 and 116 may be, for example, a microprocessor-controlled router which may be coupled to two or more data lines configured to direct data traffic through one or more communication networks.

PFD 103 is connected to microwave network links 104 and 105, and PFDs 107 and 110 are connected to microwave network links 108 and 111, respectively. Microwave network links transmit and receive information by the use of radio waves whose wavelengths are measured in small numbers of centimeters, called microwaves. In this regard, a microwave network link may comprise, among other things, an antenna (e.g., a parabolic antenna) to direct the microwaves. Microwave links are often used for point-to-point communications because their small wavelength allows conveniently-sized antennas to direct them in narrow beams, which can be pointed directly at the receiving antenna. Nevertheless, microwave links can be limited to line of sight propagation, and thus their operation can be easily affected or degraded by conditions such as heavy rain, or due to objects blocking the path of transmission.

Base stations 102, 106 and 109 connect, via radio link, to mobile, portable or fixed devices that may be gateways to other networks. Specifically, a base station may comprise a receiver/transmitter that serves as a hub of a local network, and may also be the gateway between a wired network and the wireless network, or between an external and a local wired or wireless network. As shown in FIG. 1, each of base stations 102, 106 and 109 are connected to PFDs 103, 107 and 110, respectively.

It should be understood that FIG. 1 only depicts communication system 100 as part of a network as an example, and that the number and nature of devices and connections on the network can vary widely. For example, the network could be the Internet, a Local Area Network (LAN), Wide Area Network (WAN), Metropolitan Area Network (MAN), or Personal Area Network (PAN), among others. The network can be wired or wireless or a combination thereof, and can be implemented, for example, as an Optical fiber, Ethernet, or Wireless LAN network. In addition, the network topology of the network may vary.

As shown in FIG. 1, two communication paths (#1 and #2) transmit data through system 100. For example, path #1 transmits data from PFD 103 to PFD 107 between the respective microwave network links 104 and 108, and path #2 transmits data from PFD 103 to PFD 110 between the respective microwave network links 105 and 111. Both paths converge again at PFD 112, where the data is routed to the remainder of the network. As shown in FIG. 1, however, inclement weather degrades the microwave network link 104, and therefore the transmission path between microwave network links 104 and 108. Accordingly, network controller 101 may implement a policy decision which steers more traffic to path #2 (or other paths not shown), as discussed more fully below.

Figure 2:
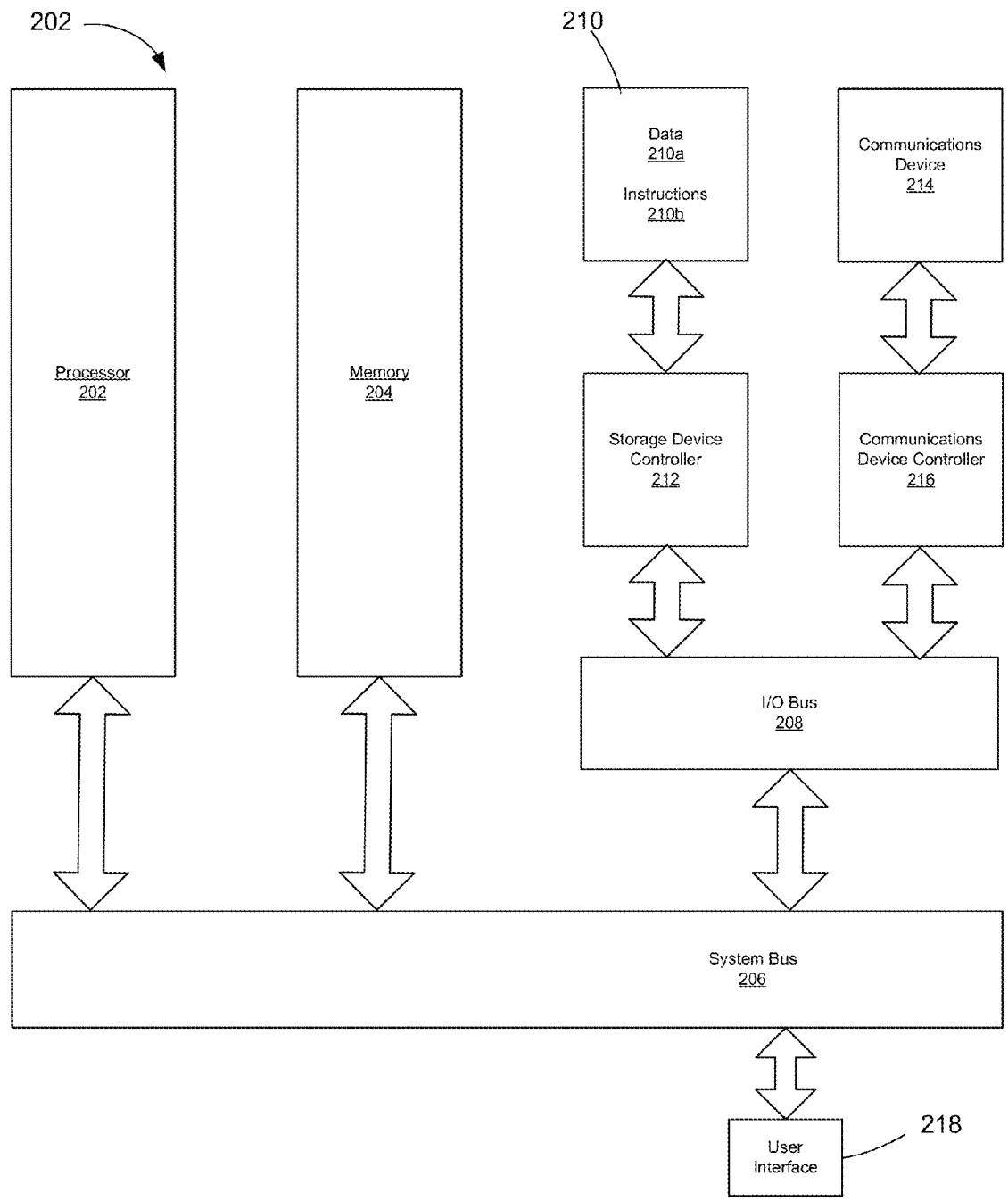
FIG. 2 is an architecture diagram of a processing system in accordance with an example embodiment described herein.

Reference is now made to FIG. 2, which is an architecture diagram of an example network controller 200, which can be used according to various aspects herein. In one example embodiment, network controller 200 may further represent, and/or be included in, individual ones of the network controller illustrated in FIG. 1 (e.g., network controller 101) or other servers or computers. Network controller 200 can be used to send and/or receive data transferred over a network, such as the communication system 100 described above, according to one example. Network controller 200 includes a processor 202 coupled to a memory 204 via system bus 206. Processor 202 is also coupled to external Input/Output (I/O) devices (not shown) via the system bus 206 and an I/O bus 208, and at least one input/output user interface 218. Processor 202 may be further coupled to a communications device 214 (i.e., an interface) via a communications device controller 216 coupled to the I/O bus 208 and bus 206. Processor 202 uses the communications device 214 to communicate with other elements of a network, such as, for example, network nodes such as other ones of the devices of FIG. 1, and the device 214 may have one or more input and output ports. Processor 202 also may include an internal clock (not shown) to keep track of time, periodic time intervals, and the like.

A storage device 210 having a computer-readable medium is coupled to the processor 202 via a storage device controller 212 and the I/O bus 208 and the system bus 206. The storage device 210 is used by the processor 202 and controller 212 to store and read/write data 210a, as well as computer program instructions 210b used to implement the procedure(s) described herein and shown in the accompanying drawing(s) herein (and, in one example, to implement the functions represented in FIG. 3). The storage device 210 also can be used by the processor 202 and the controller 212 to store other types of data, such as Ethernet traffic data. In operation, processor 202 loads the program instructions 210b from the storage device 210 into the memory 204. Processor 202 then executes the loaded program instructions 210b to perform any of the example procedure(s) described herein, for operating the network controller 200.

Figure 3:
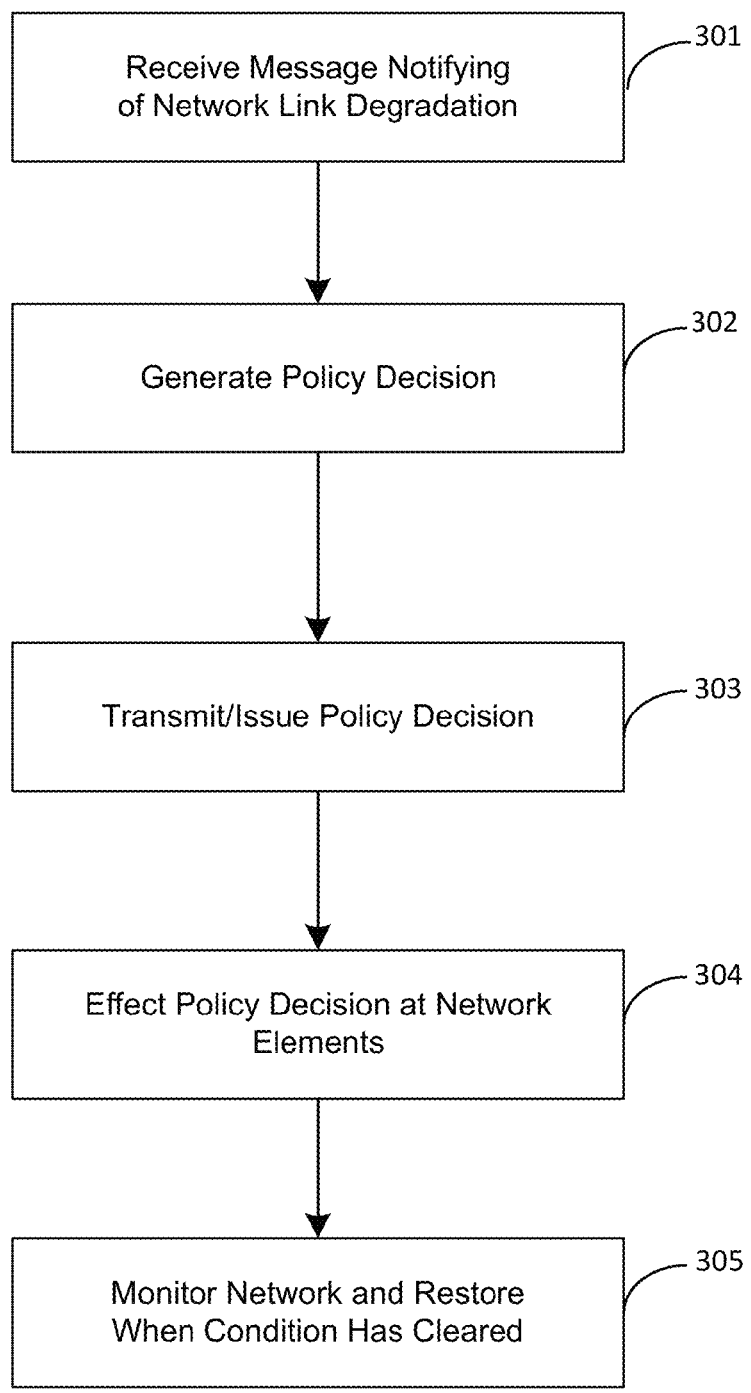
FIG. 3 is a flow diagram illustrating an example procedure for directing network traffic according to an example embodiment described herein.

FIG. 3 is a flow diagram illustrating an example procedure 300 for directing network traffic according to an example embodiment described herein.

Briefly, according to FIG. 3, one or more messages are received, notifying of a degradation or recovery of a network link and remaining available bandwidth. A policy decision is generated based on the degradation or recovery of the network link and remaining available bandwidth and capabilities of other equipment on the network. The policy decision is transmitted to a network element on the network.

In more detail, in block 301, the network controller receives a message notifying of degradation in a network link (e.g. one or more of links 104, 105, 108 or 111) and remaining available bandwidth. To that end, each network link includes microwave equipment which detects the nature of the degradation and generates the message. The message can then be transmitted from a microwave controller associated with the network link to the network controller 101. For example, a microwave controller associated with network link 104 may issue a message to network controller 101 notifying of a degradation of data transmission or clarity between network links 104 and 108, due to the inclement weather shown in FIG. 1. Details of the network link and microwave equipment will be described more fully below with respect to FIG. 4A, FIG. 4B, and FIG. 5.

In one example, a network link (e.g. network link 104) detects degradation in its ability to transmit data and will therefore reduce throughput to a lower speed to minimize errors in the data that is transmitted. For example, the network link might cut the microwave link speed by ½ (or another amount or fraction), so as to transmit information with fewer errors. After the network link decides to reduce its bandwidth, it would then send a message to network controller 101. As mentioned above, such messages often travel through the network, as connections from network controller 101 are typically virtual connections (i.e., the network controller does not necessarily have direct physical connections to each and every device).

Thus, rather than simply providing a notification of failure, a message to the network controller 101 notifies of a degradation of the network link (but not necessarily a complete failure), as well as additional information which can be used to account for the degradation, such as the amount of remaining available bandwidth at the degraded link.

In addition to the amount of remaining bandwidth, the message might also include, for example, an identification of the network link's modulation scheme to provide context to the bandwidth information (e.g., how "bad" the change is), as well as performance statistics such as, for example, information regarding a network link's space diversity or frequency diversity. Space diversity refers to, in a network link with multiple antennas at different locations, how often the network link switches between the multiple antennas (e.g., "hopping" to another antenna to try and get better reception). Frequency diversity refers to how often the network link attempts to use different frequencies. In that regard, frequent antenna hopping or frequency hopping can indicate a problem at the associated link. Thus, such information can also be transmitted to network controller 101.

Sending a message between a network link and network controller 101 ordinarily reduces some of the shortcomings of a PFD. In particular, currently PFDs and microwave links do not message operational information such as reduced throughput to each other. Moreover, PFD 112, for example, does not have any microwave equipment connected to it and in fact, 112 might have no idea that PFD 107 has a network link connected to it. For example, from a PFD's perspective, the network link might essentially be viewed as just a wire.

According to one example aspect herein, however, PFD 112 receives an instruction from network controller 101 (who has the "big picture" view), instructing to move traffic a different way, and PFD 112 complies. Thus, there is no need for PFD 112 to store information or otherwise "know" that the reason is that there is a microwave link that has limited bandwidth. Therefore, as described more fully below, network controller 101 provides a level of decision making which can take into account other devices on the network in context, and which can simplify adjustments on the network. Put another way, a PFD can generally only take action locally and cannot tell other PFDs to change their profiles, whereas network controller 101 can operate more globally and can issue instructions to PFDs and other devices on the network.

Network controller 101 may also gather information from external devices on the network. For example, network controller 101 may periodically poll devices or elements on the network (e.g., PFDs, servers, optical, OTN, Ethernet, or IP switches, etc.) for status information and capabilities such as available bandwidth, security measures, number of addresses in the routing table, or how much traffic is being transmitted on each link of alternate paths (i.e. what is their utilization). In addition, as discussed more fully below, network controller 101 might collect information regarding future or predicted events external to the network, and take this information into consideration in generating a policy decision. For example, network controller 101 might receive information from a weather radar server regarding the severity of an upcoming storm, determine which network links will be affected (if any), and move some or all traffic from affected links depending on the severity.

In block 302, a policy decision is generated at network controller 101, based on the degradation of the network link and remaining available bandwidth and capabilities of other equipment on the network.

Accordingly, rather than simply "shutting down" a degraded link, the network controller can issue a policy decision which takes into account the degradation of the network link and remaining available bandwidth, as well as capabilities of other equipment on the network. As such, according to one example embodiment, the degraded link can remain in usage and reduce the chance of overloading the network, but with policy decisions made by the network controller to maintain an acceptable level of quality of service (QoS) considering capabilities of other devices on the network. Put another way, in contrast to existing technologies, network controller 101 has a global view of the network, from end-to-end and across all layers (optical, OTN, Ethernet, IP, etc.) Therefore, network controller 101 can make much more intelligent decisions about routing (choosing the path for traffic across the network) than existing technologies.

In particular, conventionally, PFDs have a fixed set of rules that they follow that are embodied in existing routing protocols. The routing protocols define the PFDs behavior. Routing (choosing the path for traffic across the network) is based on mostly local decisions made by each PFD in turn. This is a very local decision and as a result the intelligence is distributed across each one of the PFDs, but there is no central authority to coordinate.

According to one example aspect herein, on the other hand, the network controller 101 has a global view of the network and it can route traffic optimally, taking into account the traffic load across the network from any relevant source.

Referring again to block 302, a policy decision generated at that block may, for example, instruct a PFD of the network link to adjust shapers which queue and direct the amount of traffic to the network link. In that regard, a shaper at a PFD typically delays excess traffic using a buffer, or queuing mechanism, to hold packets and shape the flow when the data rate of the source is higher than expected. In a specific example, if the available bandwidth is cut in half from 200 Mbps to 100 Mbps, the controller might adjust the shaper at the PFD on each end of the transmission path (e.g., each of PFD103 and 107) to 100 Mbps to ensure that PFDs only send the amount of traffic that they can safely transmit. Without this action, PFDs 103 and 107 might continue to present the microwave link with 200 Mbps, in which case 100 Mbps could be randomly dropped. Of course, the above description is simply an example, and various other adjustments are possible.

In some cases, the best course of action might be to route traffic around the problem. Thus, network controller 101 might address degradation by instructing PFDs 103 and 112 to take action to route traffic around an affected network link 104, using other paths of the network that do not include the link 104. Network controller 101 can also subsequently continue to monitor and poll devices (e.g., network links, PFDs, etc.) and interfaces on the network for status information or performance statistics as described above, and can take additional actions based on the impact of the first decision.

In another example, assuming that network microwave link 104 of PFD 103 is degraded by the inclement weather shown in FIG. 1, network controller 101 might issue a policy decision which instructs PFD 103 to further reduce (but not eliminate) the flow of data through PFD 103.

In still another example, the policy decision might instruct a PFD of the network link to police arriving network traffic based on the nature of the traffic. Generally, policing allows critical network traffic through the network link and drops non-critical traffic. Put another way, policing allows dropping of at least some traffic not designated as critical. The designation of traffic as critical or non-critical may be based on, for example, rules programmed in network controller 101 or received from an external source (e.g., a server). Returning again to FIG. 1, network controller 101 might issue a policy decision which instructs PFD 103 to drop certain non-critical traffic, but to continue routing critical traffic through network link 104 despite the degradation. This action protects the critical traffic by ensuring that the microwave link does not randomly drop traffic, as microwave link might not have the ability to distinguish between critical and non-critical traffic.

In still another example aspect herein, the policy decision might instruct another PFD on the network to steer some network traffic away from the degraded network link. For example, in the example shown in FIG. 1, network controller 101 might issue a policy decision which instructs a PFD several "hops" (e.g., network devices or connections) away from the degraded network link 104 at PFD 103 to steer traffic away from the degraded network link 104 at PFD 103, so that some traffic does not reach the degraded link.

In still other embodiments herein, the policy decision may be forward-looking or predictive, so as to try to account for expected degradation due to weather, maintenance, large events which might increase network usage, and the like.

Thus, according to another example embodiment herein, network controller 101 might determine whether a network link has a trend to degrade periodically based on messages received on the network, and generate and issue the policy decision prior to a next expected degradation based on the trend. Returning again to FIG. 1, a situation might arise in which, for example, network link 104 degrades frequently due to inclement weather in, for example, the month of March. With each degradation, network controller 101 receives messages from a microwave controller associated with network link 104 informing of the degradation, as described above. According to this embodiment, however, network controller 101 can use this information to determine that microwave link 104 associated with PFD 103 has a trend to degrade in the month of March, and might therefore issue policy decisions such as those outlined above, before the expected degradation in March, to avoid or minimize the effects of the degradation.

In another embodiment, network controller 101 uses historic information. In such a case, network controller 101 might store historical data, and access preset rules to determine how to anticipate and handle the degradation. For example, network controller 101 might store historical data indicating that typically, the network gets very busy when microwave degradation occurs at a specific link at a certain time. As such, network controller might want to move the traffic to a different link. Nevertheless, network controller 101 may also store historical data which indicates that simply moving traffic to another link will just cause congestion elsewhere in the network. Therefore, rather than impact other parts of the network, network controller 101 might decide to adjust the policers and shapers to drop and delay the traffic using the impacted microwave link (e.g., network link 104), rather than send traffic to a congested part of the network.

In some instances, the policy decision might instruct a PFD of the network link to direct critical network traffic to one or more paths on the network which have been predetermined to provide more reliability or superior performance.

In another example embodiment herein, the network controller may be notified of a specific upcoming expected degradation, and the policy decision can be generated and issued prior to the start of the expected degradation. As such, rather than predicting an expected degradation based on trends, the network controller may simply be informed of an upcoming degradation from another element on the network (e.g., a computer) or by input from a system administrator. For example, the date and time of upcoming maintenance or large-scale events (e.g., World Cup) may be known in advance, and accordingly network controller 101 can issue the policy decision before the start of such degradation.

In some example embodiments herein, policy decisions may not be generated or implemented until the degradation has existed for a predetermined period of time (e.g., several minutes).

Specific examples of policy decisions, and the circumstances on which they are based, will now be described. Naturally, it should be understood that there exist numerous other possible examples of policy decisions and circumstances leading thereto, which are not included herein for purposes of conciseness.

In this regard, before, during and after each event noted below, there is continuous messaging between the network controller 101 and each PFD and microwave equipment in the network, as described above. The messages indicate the utilization of each link, any congestion in the node and other useful information as well. Other devices on the network may also update network controller 101 using messaging techniques specific to the device, as mentioned above. The continuous messaging enables network controller 100 to make more thorough or well-informed decisions regarding the treatment of the traffic.

In a first example case, reduced throughput occurs in network links, and network controller 101 implements shaper adjustments. Specifically, due to some condition (often weather related), network links 104 and 108 reduce throughput. Network link 104 and network link 108 each send a message to the network controller 101 informing that their throughput has been reduced from X to Y (e.g., from 200 Mbps to 100 Mbps), as described above. Network controller 101, based on a predefined policy, then messages PFDs 103 and 107 to inform them to adjust their shapers to Y. This allows the PFDs to shape and drop if necessary the traffic in accordance with an intelligent QoS profile, a capability that the network links may not support. Once the shapers have been adjusted, PFDs 103 and 107 inform network controller 101 that the action is complete. Later, when the condition that caused the network links to reduce throughput subsides, network links 104 and 108 establish full throughput and message network controller 101 to indicate that they are back to normal conditions and have X throughput. Network controller then messages PFDs 103 and 107 to inform them to adjust their shapers back to X (the normal value).

In a second example, network controller 101 implements policer adjustments due to a reduced throughput. In particular, due to some condition (often weather related), network links 104 and 108 reduce throughput. Network link 104 and network link 108 each send a message to the network controller 101 informing that their throughput has been reduced from X to Y (e.g., from 200 Mbps to 100 Mbps), as described above. Network controller 101, based on predefined policy messages PFDs 103 and 107 telling them to adjust (or implement) their policers to Y. This allows the PFDs to drop and mark incoming traffic destined for microwave equipment using an intelligent QoS profile, a capability that network links might not support. Once the policers have been adjusted, PFDs 103 and 107 tell network controller 101 that the action is complete. Later, when the condition that caused the network links 104 and 108 to reduce throughput subsides, they then reestablish full throughput and network links 104 and 108 message network controller 101 to indicate that they are back to normal conditions and have X throughput. Network controller 101 will then message PFDs 103 and 107 telling them to adjust their policers back to X (the normal value).

In a third example, network controller 101 implements routing adjustments due to a reduced throughput. Specifically, due to some condition (often weather related), network links 104 and 108 reduce throughput. Network link 104 and network link 108 each send a message to the network controller 101 informing that their throughput has been reduced from X to Y (e.g., from 200 Mbps to 100 Mbps), as described above. Network controller 101, based on a predefined policy, determines that it is better to keep high priority traffic on path between network links 104 to 108 as there is enough throughput to support that traffic, but to move the lower priority traffic to a different port on the adjacent PFDs, as the PFDs 105 to 111 have enough bandwidth available. Network controller 101 messages PFDs 103 and 112 telling them to adjust their routing such that low priority traffic should go toward PFD 110 rather than PFD 107 and high priority traffic should continue to take its normal path through PFD 107. Once the routing has been adjusted, PFDs 103 and 112 tell network controller 101 that the action is complete. In another example it may be decided by controller 101 to effect the sending of the high priority traffic through PFD 110. Such differences depend on how the logic of network controller 101 is defined, and might be a configuration parameter established by the personnel operating the network. After the policers have been adjusted, PFDs 103 and 107 tell network controller 101 that the action is complete. Later, when the condition that caused the network links 104 and 108 to reduce throughput subsides, they then reestablish full throughput and network links 104 and 108 message network controller 101 to indicate that they are back to normal conditions and have X throughput. Network controller 101 will then message PFDs 103 and 107 telling them to adjust their routing back to X (the normal value).

Network controller 101 can be programmed to handle many scenarios, including other solutions for moving traffic at the PFDs, and/or employing predictive algorithms for responding to known events (maintenance or some known daily event). Also, there is the case where no action is decided to be taken, as network controller 101 might learn over time that these events are usually short lived and therefore taking action could cause more harm than good.

Returning now to FIG. 3, in block 303, the policy decision is transmitted to a network element on the network for distribution to the network. Thus, for example, network controller 101 might transmit a policy decision to PFD 103 based on degradation at network link 104. Naturally, the policy decision may also be transmitted to other devices on the network as necessary or useful to implement the policy decision. For example, if PFD 110 is expected to take on additional traffic or to move traffic based on the degradation at network link 104, the policy decision is also transmitted to PFD 110 so that the decision can be implemented.

In one embodiment, network controller 101 has a view of the entire network and all links and equipment within the network. As mentioned above, all "intelligent" SDN capable elements in the network will periodically inform network controller 101 of the conditions of the links that it supports. Network controller 101, knowing the conditions of the entire network can then make intelligent decisions and have equipment either shape, police or route traffic as it deems the best approach.

The PFDs (e.g., PFD 103) are often the entities that receive the policy decision, and they take the action and then report back to network controller 101 when the action is complete. The reason this action is often taken at the PFD is that the PFDs are typically the device that has the intelligence and capability to take actions required to move traffic to a different path or to shape or police, whereas other elements in the network might have less capabilities built in.

Meanwhile, the network controller 101 can determine where to send the policy decision because it will have a view of and information exchange with all devices in the network, and the available bandwidth is on all links and what alternate paths exist. Thus, network controller 101 can therefore make the decisions based on what it deems as being the best action for the overall health of the entire network, and issue one or more policy decisions to parts of the network so that the policy decision is effected. Accordingly, using all available information on the current and future state of the microwave link, such as, for example (and without limitation), one or more of the link state reported by the microwave link equipment, the link quality measured by the packet forwarding devices on either end of the link, the weather forecast, and current radar information, the network controller 101 can determine the present and/or predicted future state of the microwave link and issue one or more policy decisions to, for example, effect a reduction of the traffic on the link to fit the available bandwidth or to re-route the traffic around the link taking into account the state of the remainder of the network.

In block 304, the elements that receive the decision take action to effect them, in the manner described above for example. Put another way, network elements receive the policy decision from network controller 101 and effect the policy decision. Thus, for example, PFDs adjust their routing, policers, or shapers based on the received policy decision.

In block 305, network controller 101 continues to monitor the network (e.g., by the continuous messaging described above), and conditions are restored to a default or "normal" arrangement once the condition has cleared. Put another way, network controller 101 can also generate policy decisions based on a recovery of a network link (as opposed to a degradation). For example, network controller 101 might receive an update message from network link 104 indicating a recovery, e.g., that the degradation, or the conditions responsible therefor, have passed. As such, network controller 101 might issue instructions to the network to restore the network back to the settings and/or configuration which existed prior to the degradation. At least some examples of the manner in which block 305 may be performed were described above.

Figure 4A:
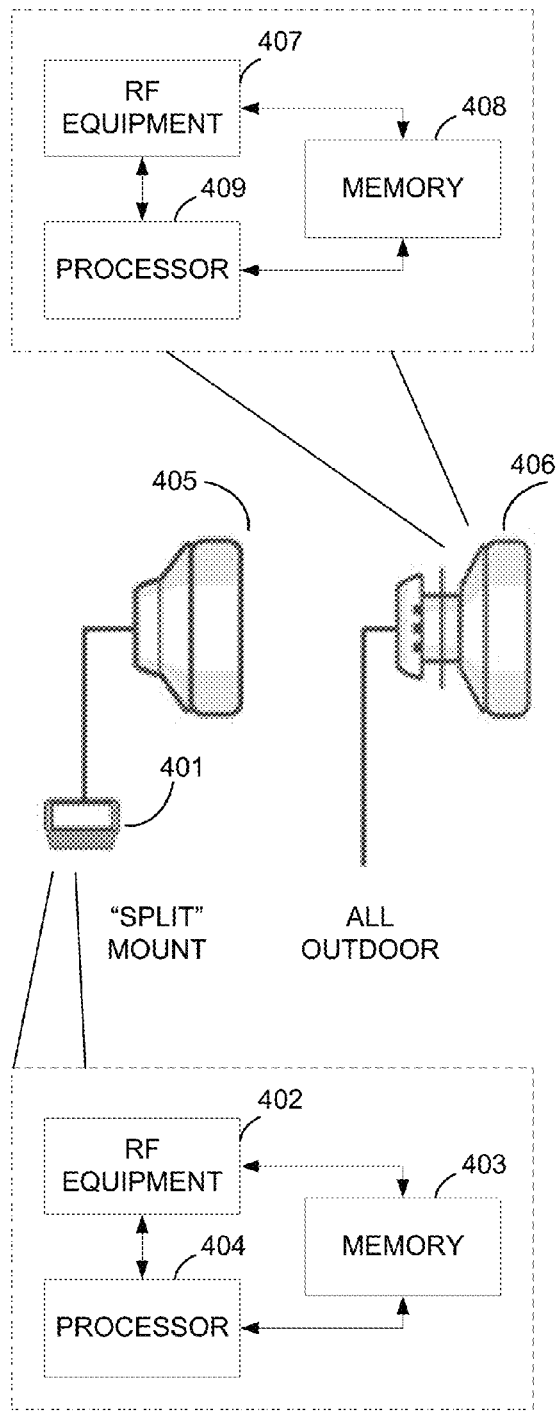
FIGS. 4A and 4B are representative views of microwave links and equipment according to example embodiments described herein.
Figure 4B:
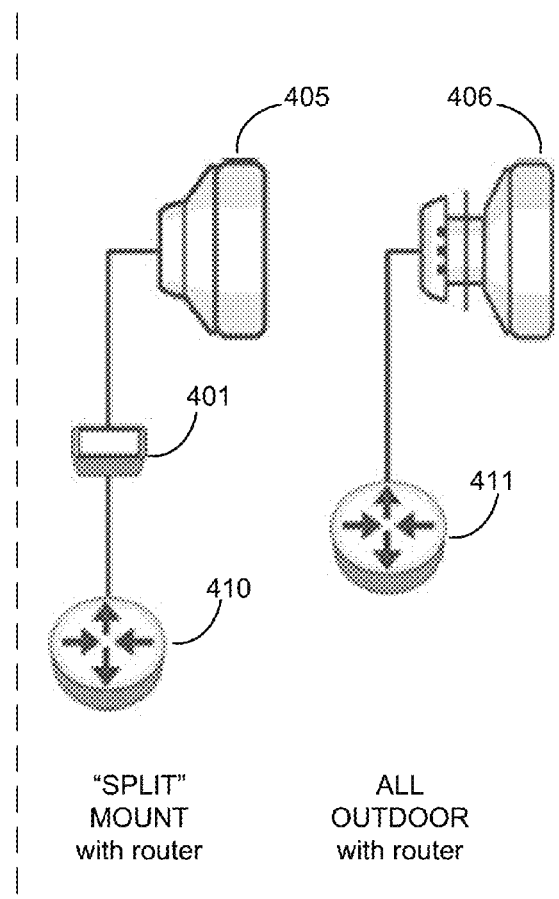

FIGS. 4A and 4B are representative views of microwave links and equipment according to example embodiments described herein.

As shown in FIGS. 4A and 4B, a network link, and microwave equipment corresponding thereto, has 3 major components: (1) antenna (e.g., antenna 405 or 406), (2) RF equipment such as amplifiers (e.g., RF equipment 402 and 407) and (3) digital equipment such as a processor and a memory (e.g., processor 404 or processor 409 and memory 403 or memory 408). The processor and memory (e.g., processor 404 or processor 409 and memory 403 or memory 408) decide when to reduce throughput and by which quantity, and generate and receive messages in order to communicate with network controller 101.

In more detail, as shown in FIG. 4A, a network link might be configured in "SPLIT MOUNT" configuration such that a housing element 401 stores the RF equipment 402 and digital equipment (memory 403 and processor 404), whereas antenna 405 is remote and, for example, connected using RF cabling between the two. On the other hand, a network link might be configured in an "ALL OUTDOOR" configuration in which all of the components (RF equipment 407, memory 408, processor 409) are incorporated in the housing or hardware of an antenna 406.

FIG. 4B depicts the housing element 401, antenna 405 and antenna 406 depicted in FIG. 4A, but in another example configuration with a router added. Specifically, FIG. 4B depicts a router 410 connected to housing element 401 of the "SPLIT MOUNT" configuration, and a router 411 connected to antenna 406 of the "ALL OUTDOOR" configuration. The router 410 and/or 411 may further represent a corresponding PFD depicted in FIG. 1.

Figure 5:
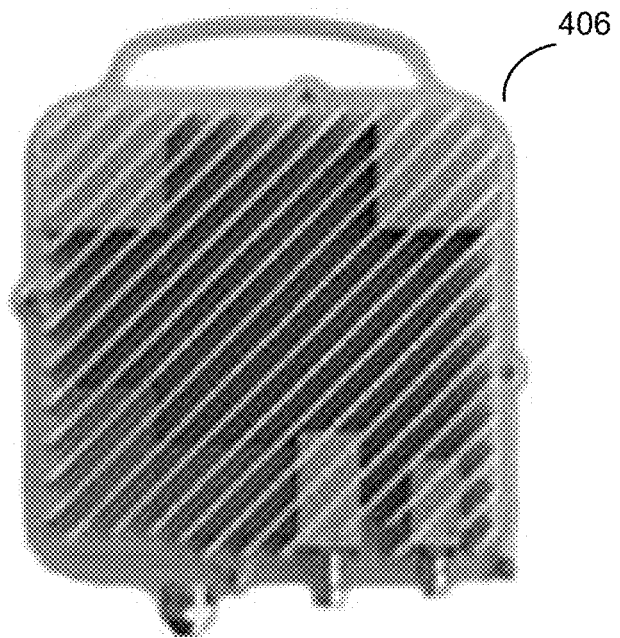
FIG. 5 is a representative view of microwave link hardware according to an example embodiment described herein.

FIG. 5 is a representative view of at least part of a microwave link according to an example embodiment described herein.

In particular, FIG. 5 is an illustration of the network link 406, in the "ALL OUTDOOR" configuration shown in FIG. 4A. Thus, network link 406 is an antenna which includes RF equipment 407, memory 408 and processor 409 packaged together inside, as described with respect to FIG. 4A above. All functions still exist, but are physically located inside of one package. With a configuration such as that shown in FIG. 5, network link 406 might be located on a tower, or side of a building or the like, while a corresponding PFD might be inside the building, or, for example, at the bottom of the tower. In a "SPLIT MOUNT" configuration, some equipment (the antenna) might be on a tower, and the other equipment might be located near the PFD, though it could be some distance from the PFD as well.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action or to produce a result. In other embodiments, functions performed by software can instead be performed by hardcoded modules.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A system comprising:
a network controller, comprising:
an interface operable to receive one or more messages, the messages notifying of at least an occurrence of (1) a current degradation or recovery of a network link, and (2) an upcoming expected degradation of a network link, wherein in a case that a message notifies of an occurrence of a current degradation or recovery of a network link, the message also notifies of a remaining available bandwidth of the network link; and
a processor operable to generate a policy decision based on capabilities of other equipment on the network and one or more of (1) the degradation or recovery of the network link and the remaining available bandwidth of the network link, or (2) the upcoming expected degradation of the network link, and operable to transmit the policy decision to a network element on the network with the interface.

2. The system of claim 1, further comprising the network element, wherein the network element is arranged to receive the policy decision from the interface and effect the policy decision.

3. The system of claim 1, wherein the network element is a packet forwarding device.

4. The system of claim 1, wherein the policy decision instructs a packet forwarding device of the network to adjust shapers which queue and direct the amount of traffic to network links.

5. The system of claim 1, wherein the policy decision instructs a packet forwarding device of the network to police arriving network traffic based on the nature of the traffic.

6. The system of claim 5, wherein the policing allows dropping of at least some traffic not designated as critical.

7. The system of claim 1, wherein the policy decision instructs a packet forwarding device on the network to steer some network traffic away from the degraded network link.

8. The system of claim 1, wherein the processor is further operable to determine whether the network link has a trend to degrade periodically based on messages received on the network, and operable to generate and issue the policy decision prior to a next expected degradation based on the trend.

9. The system of claim 1, wherein in a case that a message notifies of an upcoming expected degradation, the policy decision is generated and issued prior to the start of the expected degradation.

10. The system of claim 9, wherein the policy decision instructs a packet forwarding device of the network link to direct critical network traffic to one or more paths on the network which have been predetermined to provide more reliability or superior performance.

11. The system of claim 1, wherein the network link includes microwave equipment operable to detect the nature of the degradation and generate the message.

12. A procedure for directing network traffic, the procedure being executed by a network controller and comprising:
   receiving one or more messages, the messages notifying of at least an occurrence of (1) a current degradation or recovery of a network link and (2) an upcoming expected degradation of a network link, wherein in a case that a message notifies of an occurrence of a current degradation or recovery of a network link, the message also notifies of a remaining available bandwidth of the network link;
   generating a policy decision based on the capabilities of other equipment on the network and one or more of (1) the degradation or recovery of the network link and the remaining available bandwidth of the network link, or (2) the upcoming expected degradation of the network link; and
   transmitting the policy decision to a network element on the network.

13. The procedure of claim 12, wherein the network element is operable to receive the policy decision and effect the policy decision.

14. The procedure of claim 12, wherein the network element is a packet forwarding device.

15. The procedure of claim 12, wherein the policy decision instructs a packet forwarding device of the network to adjust shapers which queue and direct the amount of traffic to network links.

16. The procedure of claim 12, wherein the policy decision instructs a packet forwarding device of the network to police arriving network traffic based on the nature of the traffic.

17. The procedure of claim 16, wherein the policing allows dropping of at least some traffic not designated as critical.

18. The procedure of claim 12, wherein the policy decision instructs a packet forwarding device on the network to steer some network traffic away from the degraded network link.

19. The procedure of claim 12, further comprising determining whether the network link has a trend to degrade periodically based on messages received on the network, and generating and issuing the policy decision prior to a next expected degradation based on the trend.

20. The procedure of claim 12, wherein in a case that a message notifies of an upcoming expected degradation, the policy decision is generated and issued prior to the start of the expected degradation.

21. The procedure of claim 20, wherein the policy decision instructs a packet forwarding device of the network link to direct critical network traffic to one or more paths on the network which have been predetermined to provide more reliability or superior performance.

22. The procedure of claim 12, wherein the network link includes microwave equipment which detects the nature of the degradation and generates the message.

23. A non-transitory computer-readable storage medium containing a computer program having instructions which, when executed by a computer, cause the computer to act as a network controller to carry out a procedure for directing traffic on a network, the procedure comprising:
   receiving one or more messages, the messages notifying of at least an occurrence of (1) a current degradation or recovery of a network link, and (2) an upcoming expected degradation of a network link, wherein in a case that a message notifies of an occurrence of a current degradation or recovery of a network link, the message also notifies of a remaining available bandwidth of the network link;
   generating a policy decision based on capabilities of other equipment on the network and one or more of (1) the degradation or recovery of the network link and the remaining available bandwidth of the network link, or (2) the upcoming expected degradation of the network link; and
   transmitting the policy decision to a network element on the network.

* * * * *